US012382127B2

(12) United States Patent
Yi et al.

(10) Patent No.: US 12,382,127 B2
(45) Date of Patent: Aug. 5, 2025

(54) CONTINUING VIDEO PLAYBACK WHEN SWITCHING FROM A DYNAMIC PAGE TO A NON-DYNAMIC PAGE

(71) Applicant: Tencent Technology (Shenzhen) Company Limited, Guangdong (CN)

(72) Inventors: Cheng Yi, Shenzhen (CN); Bin Li, Shenzhen (CN); Cheng Luo, Shenzhen (CN); Xiaobo Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 168 days.

(21) Appl. No.: 18/369,036

(22) Filed: Sep. 15, 2023

(65) Prior Publication Data

US 2024/0007701 A1    Jan. 4, 2024

Related U.S. Application Data

(63) Continuation of application No. PCT/CN2023/078654, filed on Feb. 28, 2023.

(30) Foreign Application Priority Data

Mar. 8, 2022   (CN) .......................... 202210220023.8

(51) Int. Cl.
*H04N 21/431*     (2011.01)
(52) U.S. Cl.
CPC .............................. *H04N 21/4312* (2013.01)
(58) Field of Classification Search
CPC .................................................. H04N 21/4312
See application file for complete search history.

(56) References Cited

U.S. PATENT DOCUMENTS 6,199,082 B1 *  3/2001  Ferrel .................... G06F 16/958
                                                     707/E17.116
8,196,112 B1 *  6/2012  Cansizlar ............ G06F 11/3672
                                                     717/124

(Continued)

FOREIGN PATENT DOCUMENTS

CN        107197393 A      9/2017
CN        107277601 A     10/2017

(Continued)

OTHER PUBLICATIONS

International Search Report issued May 19, 2023 in Application No. PCT/CN2023/078654, with English Translation, pp. 1-24.

*Primary Examiner* — Thai Q Tran
*Assistant Examiner* — Jose M Mesa
(74) *Attorney, Agent, or Firm* — ArentFox Schiff LLP

(57) ABSTRACT

A multimedia processing method includes rendering, through a first native container node of a dynamic page, a content node associated with the first native container node to play multimedia content. The method further includes generating a non-dynamic page in response to a first page switching operation triggered in the dynamic page, and creating a second native container node in a second node tree of the non-dynamic page, the second native container node being supported by the native application framework provided by the operating system. The method further includes disassociating the content node from the first native container node, and establishing an association between the content node and the second native container node. The method further includes rendering, through the second native container node, the content node in the non-dynamic page to continue playing the rendered multimedia content in a portion of the generated non-dynamic page.

20 Claims, 14 Drawing Sheets

(56) References Cited

U.S. PATENT DOCUMENTS

| | | | | |
|---|---|---|---|---|
| 10,574,703 B1* | 2/2020 | Tribble | ............... | H04L 63/12 |
| 2001/0052000 A1* | 12/2001 | Giacalone, Jr. | ........ | G06Q 30/02 |
| | | | | 705/14.69 |
| 2014/0304756 A1* | 10/2014 | Fletcher | ........... | H04N 21/26258 |
| | | | | 725/115 |

FOREIGN PATENT DOCUMENTS

| | | |
|---|---|---|
| CN | 110582017 A | 12/2019 |
| CN | 113891135 A | 1/2022 |

\* cited by examiner

CONTINUING VIDEO PLAYBACK WHEN SWITCHING FROM A DYNAMIC PAGE TO A NON-DYNAMIC PAGE

RELATED APPLICATIONS

This application is a continuation of International Application No. PCT/CN2023/078654, filed on Feb. 28, 2023, which claims priority to Chinese Patent Application No. 202210220023.8, entitled "MULTIMEDIA CONTENT PLAYBACK METHOD AND APPARATUS, DEVICE, AND STORAGE MEDIUM", filed on Mar. 8, 2022. The disclosures of the prior applications are hereby incorporated by reference in their entirety.

FIELD OF THE TECHNOLOGY

This application relates to the technical field of computers, and in particular to, a multimedia content processing method and apparatus, a device, a program product, and a storage medium.

BACKGROUND OF THE DISCLOSURE

With the development of Internet technology, the types and quantities of application programs are increasing, and the functions of the application programs are becoming more and more abundant. In order to meet the development requirements of different application functions in an application program, under the related art, an application program is developed using a mixture of a native application framework and a cross-platform dynamic framework. Therefore, the application program includes both a dynamic page developed using the cross-platform dynamic framework and a non-dynamic page developed using the native application framework (also referred to as a native page).

For a video playback function in the application program, if a video needs to be played on the dynamic page, a corresponding content node needs to be embedded in the dynamic page. The embedded content node in the dynamic page strongly depends on the cross-platform dynamic framework and cannot exist separately from the dynamic page. Therefore, when the application program switches from the dynamic page to the non-dynamic page, the video on the dynamic page cannot be rendered on the non-dynamic page, which results in the video cannot be played on the non-dynamic page.

SUMMARY

The embodiments of this disclosure provide a multimedia content processing method and apparatus, a device, and a storage medium, which are helpful to enable a video on a dynamic page to continue to be played on a non-dynamic page when switching from the dynamic page to the non-dynamic page, preventing the interruption of video playback in the page switching, and improving the convenience of content presentation on the device and the data processing performance for multimedia.

In an embodiment, a multimedia content processing method includes rendering, through a first native container node in a first node tree of a dynamic page, a content node associated with the first native container node to play rendered multimedia content, the first native container node being supported by a native application framework provided by an operating system. The method further includes generating a non-dynamic page in response to a first page switching operation triggered in the dynamic page, and creating a second native container node in a second node tree of the non-dynamic page, the second native container node being supported by the native application framework provided by the operating system. The method further includes disassociating the content node from the first native container node, and establishing an association between the content node and the second native container node. The method further includes rendering, through the second native container node, the content node in the non-dynamic page to continue playing the rendered multimedia content in a portion of the generated non-dynamic page.

In an embodiment, a multimedia content processing apparatus includes processing circuitry configured to render, through a first native container node in a first node tree of a dynamic page, a content node associated with the first native container node to play rendered multimedia content, the first native container node being supported by a native application framework provided by an operating system. The processing circuitry further configured to generate a non-dynamic page in response to a first page switching operation triggered in the first dynamic page, and create a second native container node in a second node tree of the non-dynamic page, the second native container node being supported by the native application framework provided by the operating system. The processing circuitry further configured to disassociate the content node from the first native container node, and establish an association between the content node and the second native container node, and render, through the second native container node, the content node in the non-dynamic page to continue playing the rendered multimedia content in a portion of the generated non-dynamic page.

In an embodiment, a non-transitory computer-readable storage medium storing computer-readable instructions thereon, which, when executed by processing circuitry, cause the processing circuitry to perform a multimedia content processing method including rendering, through a first native container node in a first node tree of a dynamic page, a content node associated with the first native container node to play rendered multimedia content, the first native container node being supported by a native application framework provided by an operating system. The method further includes generating a non-dynamic page in response to a first page switching operation triggered in the dynamic page, and creating a second native container node in a second node tree of the non-dynamic page, the second native container node being supported by the native application framework provided by the operating system. The method further includes disassociating the content node from the first native container node, and establishing an association between the content node and the second native container node. The method further includes rendering, through the second native container node, the content node in the non-dynamic page to continue playing the rendered multimedia content in a portion of the generated non-dynamic page.

BRIEF DESCRIPTION OF THE DRAWINGS

In order to explain the technical solutions of the embodiments of this disclosure more clearly, the following description is given with reference to the drawings, which are to be used in the description of the embodiments. It is obvious that the drawings in the following description are only some embodiments of this disclosure. The ordinarily skilled in the art would have been able to acquire other drawings according to these drawings.

DESCRIPTION OF EMBODIMENTS

Figure 1:
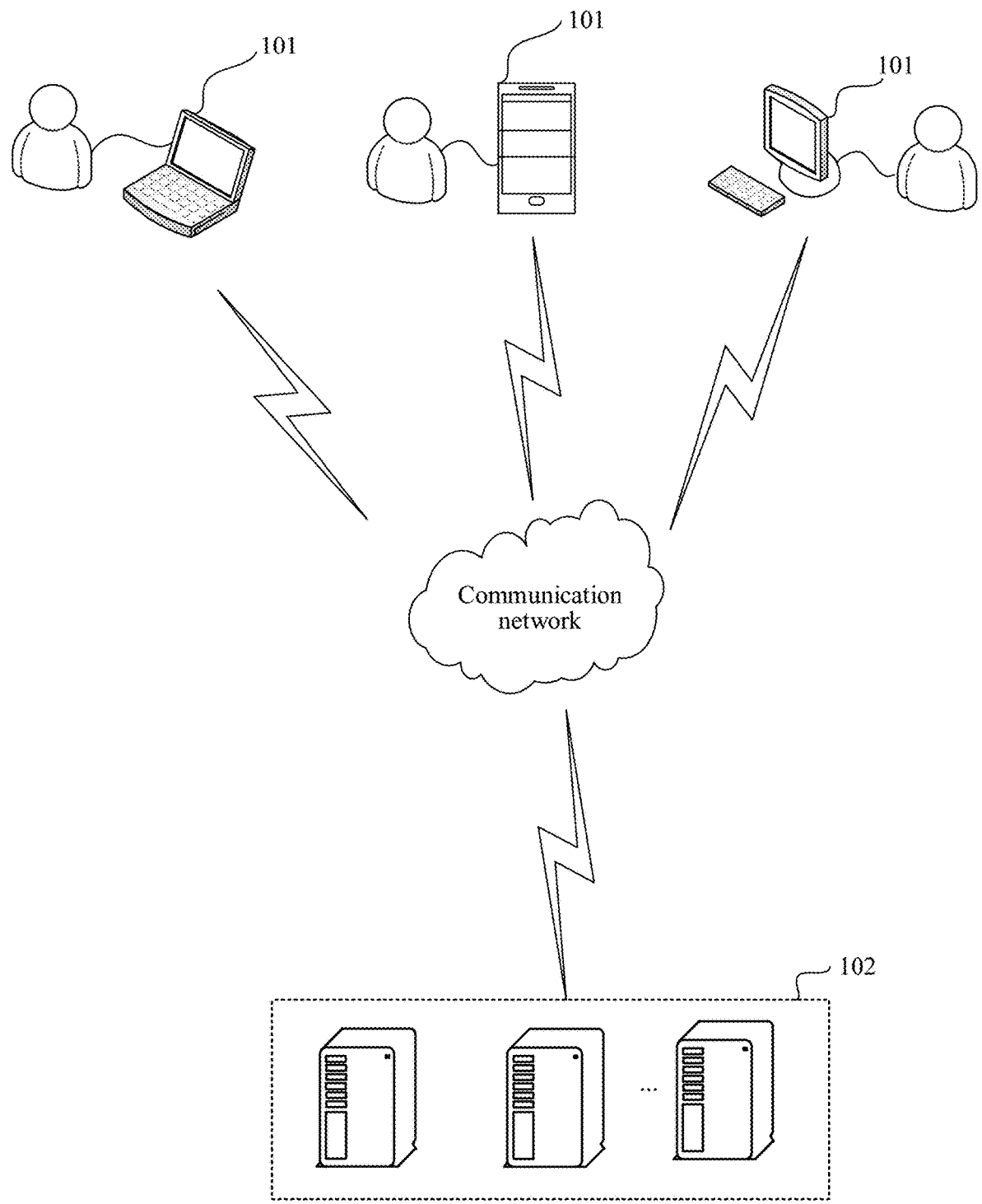
FIG. 1 is a diagram of a system architecture provided by an embodiment of this disclosure.

To make the objectives, technical solutions, and advantages of this disclosure clearer, the following further describes this disclosure in detail with reference to the drawings and embodiments. It is to be understood that the specific embodiments described herein are intended only to interpret this disclosure and are not intended to limit this disclosure.

To facilitate understanding, the following explains the terms involved in the embodiments of this disclosure.

Cross-platform dynamic technology refers to the technology of a cross-platform dynamic framework (which may also be referred to as a cross-platform framework), and the cross-platform dynamic technology is a hot technology applied to mobile terminal application development in recent years; the cross-platform refers that a set of application codes can run on mobile terminals of various operating systems (iOS/Android, and the like). Application programs built on the cross-platform framework do not need to be encoded separately for each platform but can run on a plurality of platforms with one encoding. The term "dynamic" means that the updated application program code can be dynamically downloaded to the mobile terminal to update the application program, to get rid of the problem that the application program update function needs to issue a new version. In practical applications, the cross-platform dynamic technology includes h5 (JS dynamic interpretation execution code+web view cross-platform rendering), an applet (h5 combined with system native control rendering), React Native (JS dynamic interpretation execution code+ native control rendering), and the like.

Flutter is a cross-platform mobile user interface (UI) framework. Its greatest features are that under the Flutter framework, all interface elements are self-drawn (rather than using the system application program interfaces or controls of the respective systems), so they can appear the same UI pictures on Android and iOS. In addition, Flutter has excellent rendering performance, and its fluency is not inferior to the native control of the system, so it has been widely used in mobile cross-platform solutions.

Video minimization refers to the video being played in a minimized manner, also commonly referred to as a video window. For example, when a terminal device plays a video in a first page of an application program, in response to a page switching operation, the content of a second page is presented while continuously playing the video in a minimized manner in a certain corner of the second page, achieving a good experience of simultaneously browsing the content of the second page and the video.

The supporting embeddable native control technology refers to the cross-platform dynamic framework supports the introduction of a native control, and then takes this native control as a base rendering node for typesetting and rendering together with other dynamic nodes. The native control herein refers to a control supported by a native application framework provided by an operating system and may be referred to as a native node. The size and position of the display of this native control on the dynamic page can be specified by the dynamic page developer, while some dynamic components can be overlaid on it and can be linked with the page, such as responding to list scrolling and responding to gestures and touches.

A dynamic page refers to a page developed using a cross-platform dynamic framework (which may also be referred to as a cross-platform framework or a cross-platform development framework).

A non-dynamic page refers to a page developed using a native application framework, and the non-dynamic page may also be referred to as a native page. The native application framework refers to the application framework provided by the operating system of the device, including, for example, a graphic user interface (GUI) native framework (component).

A node tree refers to a tree structure for representing an extensive markup language (XML) document, including a plurality of nodes; the nodes have a hierarchical relationship with each other; and parent, child, and peer nodes are used to describe the hierarchical relationship. Common node trees include a document object model (DOM) tree, a Flutter widget tree, and the like.

Container node refers to that a control node or view node can be wrapped (associated) on a parent node, and the rendering position, size, and life cycle of the control node or view node are determined by the parent node. At the same time, a control node or view node can also cut from one parent node to another parent node for re-rendering. Such a parent node is a container node. For example, a div node of a hypertext markup language (HTML) and a UI View node in an iOS native control are container nodes. In other words, a container node is a node that a node tree to be rendered (for example, a node tree corresponding to a dynamic page) uses to render its associated control node or view node.

A native container node refers to a container node supported by a native application framework provided by an operating system.

The design solutions for the embodiment of this disclosure are described below.

In order to meet the development requirements of different application functions in an application program, under the related art, an application program is developed using a mixture of a native application framework and a cross-platform dynamic framework. Therefore, the application program includes both a dynamic page developed using the cross-platform dynamic framework and a non-dynamic page developed using the native application framework (also referred to as a native page).

For a video playback function in the application program, if a video needs to be played on the dynamic page, a corresponding content node needs to be embedded in the dynamic page. The embedded content node in the dynamic page strongly depends on the cross-platform dynamic framework, that is, cannot exist separately from the dynamic page. Therefore, when the application program switches from the dynamic page to the non-dynamic page, the video in the dynamic page cannot be rendered in the non-dynamic page, which results in that the video cannot be played on the non-dynamic page.

In view of this, the embodiments of this disclosure provide a multimedia content processing method executed in a computer device, the method including: playing multimedia content in a first dynamic page of an application, a first node tree corresponding to the first dynamic page including a content node corresponding to the multimedia content and a first native container node associated with the content node; creating a non-dynamic page in response to a first page switching operation triggered in the first dynamic page; creating, through a container switching component, a second native container node in a second node tree corresponding to the non-dynamic page, disassociating the content node from the first native container node, and establishing an association between the content node and the second native container node; and rendering, through the second native container node, the content node in the non-dynamic page to play rendered target multimedia content. In an embodiment of this disclosure, a container switching component is configured in an application for being able to create a second native container node for rendering a content node in a second node tree corresponding to the non-dynamic page in response to a page switching operation form the dynamic page to the non-dynamic page, disassociating the content node from the first native container node, and establishing the association between the content node and the second native container node.

In an embodiment of this disclosure, when switching from a first dynamic page to a non-dynamic page is triggered, a second native container node can be created in a second node tree corresponding to the non-dynamic page via a container switching component, and a content node is disassociated from the first native container node, and the association between the content node and the second native container node is established; therefore, when rendering the non-dynamic page based on the second node tree, the content node can be correspondingly rendered in the non-dynamic page via the second native container node, to continue rendering and playing multimedia content on the non-dynamic page after the page switching. Thus, the convenience of content presentation in the device and the data processing performance of multimedia are improved, and the viewing experience of the user object is further improved.

The embodiments of this disclosure provide a multimedia content processing method executed in a computer device, the method including:
rendering, through a first native container node in a first node tree, a content node associated with the first native container node in a first dynamic page to play rendered multimedia content;
creating a non-dynamic page in response to a first page switching operation triggered in the first dynamic page;
creating a second native container node in a second node tree corresponding to the non-dynamic page;
disassociating the content node from the first native container node;
establishing an association between the content node and the second native container node; and
rendering, through the second native container node, the content node in the non-dynamic page to play rendered target multimedia content. The solutions of the embodiments of this disclosure are helpful to enable a video on a dynamic page to continue to be played on a non-dynamic page when switching from the dynamic page to the non-dynamic page, preventing the interruption of video playback in the page switching, and improving the convenience of content presentation in the device and the data processing performance for multimedia.

Referring to FIG. 1, it is a system architecture diagram applicable to an embodiment of this disclosure. The system architecture includes at least a terminal device 101 and a server 102; the number of terminal devices 101 may be one or more, and the number of servers 102 may also be one or more; and this disclosure does not specifically define the number of terminal devices 101 and servers 102.

An application with a multimedia content playback function is pre-installed in the terminal device 101; the type of the application may be a client application, an applet application, and the like. The application may be particularly an instant messaging application, an office application, a short video application, a live broadcast application, a map application, and the like. The terminal device 101 may be but is not limited to, a smartphone, a tablet, a laptop, a desktop computer, a smart home appliance, a smart voice interaction device, a smart vehicle terminal, and an aircraft.

The server 102 is a background server of an application. The server 102 may be an independent physical server, may also be a server cluster or distributed system composed of a plurality of physical servers, and may also be a cloud server providing basic cloud computing services such as a cloud service, a cloud database, cloud computing, a cloud function, cloud storage, a network service, cloud communication, a middleware service, a domain name service, a security service, a content delivery network (CDN), and a large data and artificial intelligence platform. The terminal device 101 and the server 102 may be directly or indirectly connected through wired or wireless communication, and this disclosure is not limited thereto.

The multimedia content processing method in the embodiment of this disclosure can be executed by the terminal device 101, or can be executed by the terminal device 101 interacting with the server 102.

The terminal device 101 executes the multimedia content processing method in the embodiment of this disclosure, for example, including the following steps:

The terminal device 101 plays multimedia content in a first dynamic page of an application, a first node tree corresponding to the first dynamic page including a content node corresponding to the multimedia content and a first native container node associated with the content node.

The terminal device 101 creates a non-dynamic page in response to a first page switching operation triggered in the first dynamic page. It creates, through a container switching component, a second native container node in a second node tree corresponding to the non-dynamic page, disassociates the content node from the first native container node, and establishes an association between the content node and the second native container node. Then it renders, through the second native container node, the content node in the non-dynamic page to play rendered target multimedia content.

In practical applications, the multimedia content processing method in the embodiments of this disclosure can be applied to a scene where multimedia content is played in various types of applications, such as an instant messaging application, an office application, a short video application, a live broadcast application, and a map application.

Figure 2:
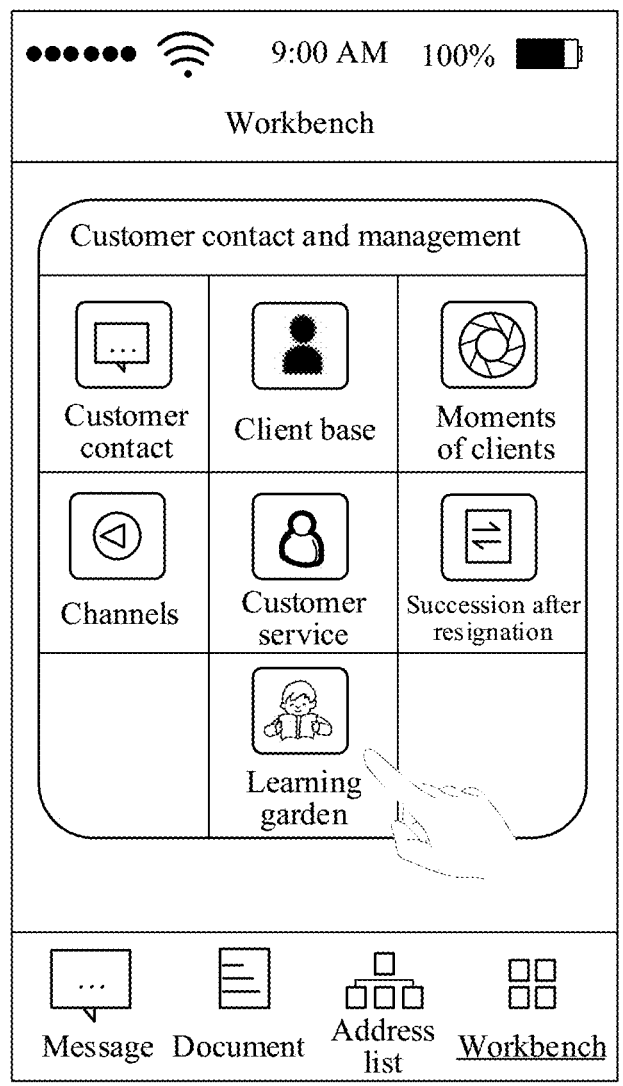
FIG. 2 is a diagram of a workbench page provided by an embodiment of this disclosure.

For example, for playing a video in an office application, referring to FIG. 2, it is a workbench page of an office application provided by an embodiment of this disclosure, and the workbench page is a non-dynamic page.

Figure 3:
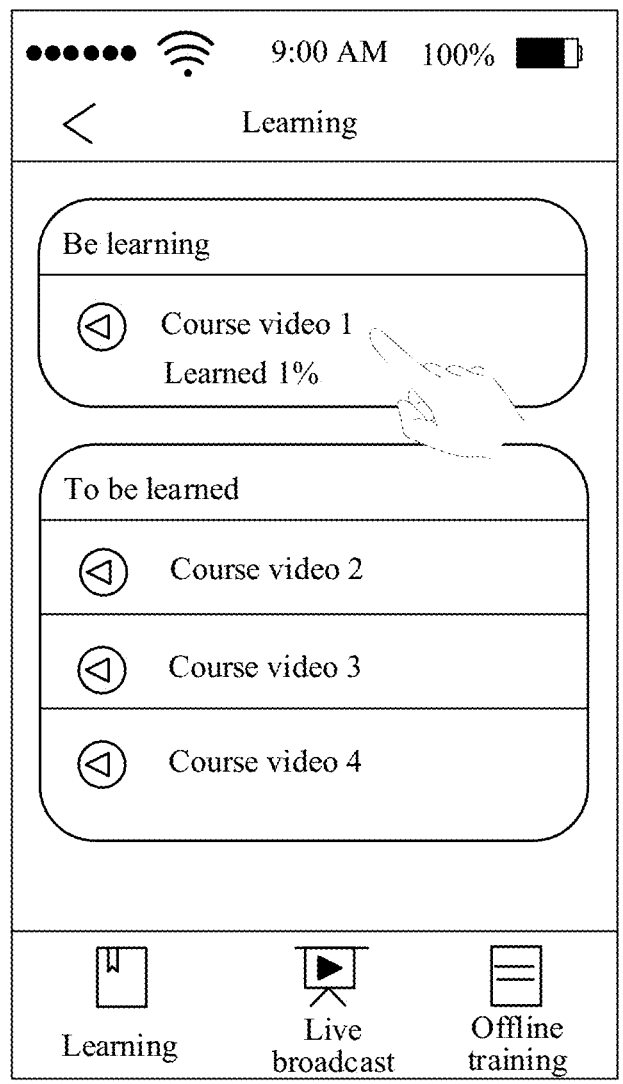
FIG. 3 is a diagram I of a learning page provided by an embodiment of this disclosure.

In response to a viewing operation triggered in a workbench page for a "learning garden" icon, the workbench page is switched to a learning page. The learning page is a dynamic page as shown in FIG. 3; the learning page includes a course video 1, a course video 2, a course video 3, and a course video 4.

Figure 4:
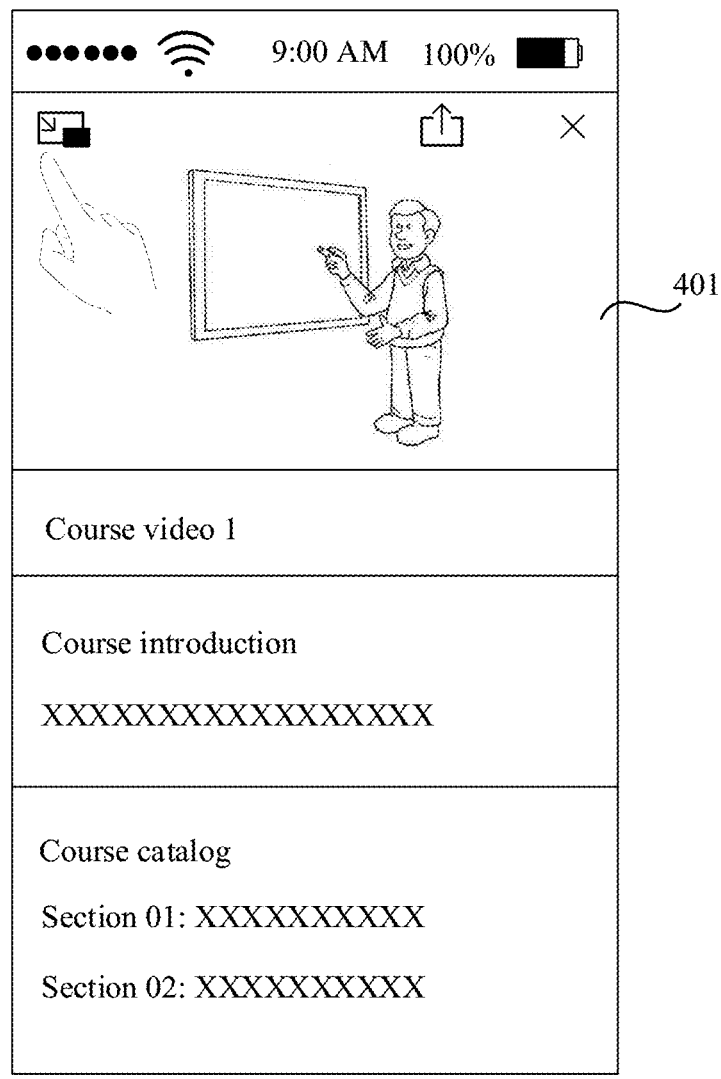
FIG. 4 is a diagram of a video playback page provided by an embodiment of this disclosure.

In response to a playback operation triggered for the course video 1 in the learning page, the learning page is switched to a video playback page. The video playback page is a dynamic page as shown in FIG. 4; the video playback page includes a video playback area 401; the course video 1 is played in the video playback area 401, and relevant information about the course video 1 is displayed in other areas.

Figure 5:
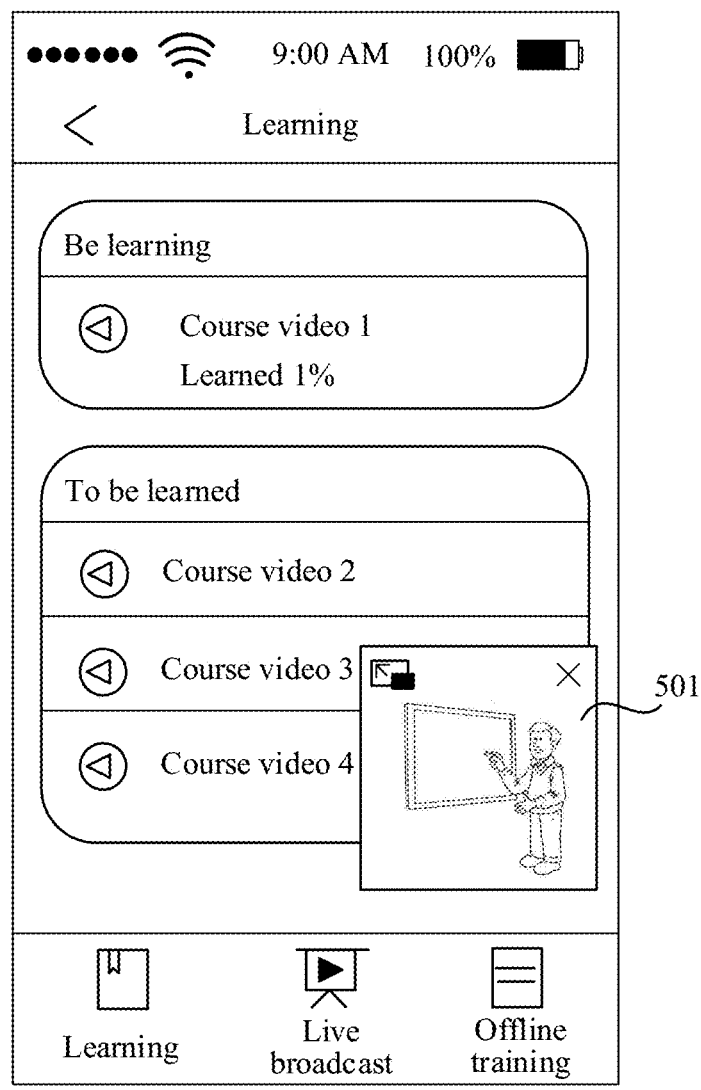
FIG. 5 is a diagram II of a learning page provided by an embodiment of this disclosure.

In response to a page switching operation triggered in the video playback page, the video playback page is switched to the learning page; the first page switching operation may be clicking a video minimized button in the upper left corner of the video playback page. The learning page is shown in FIG. 5. The course video 1 is played using the video minimized playback mode in the lower right corner of the learning page, namely, playing the course video 1 in the minimized window 501; the minimized window 501 also includes a page recovery button on the upper left and a close button on the upper right corner.

Figure 6:
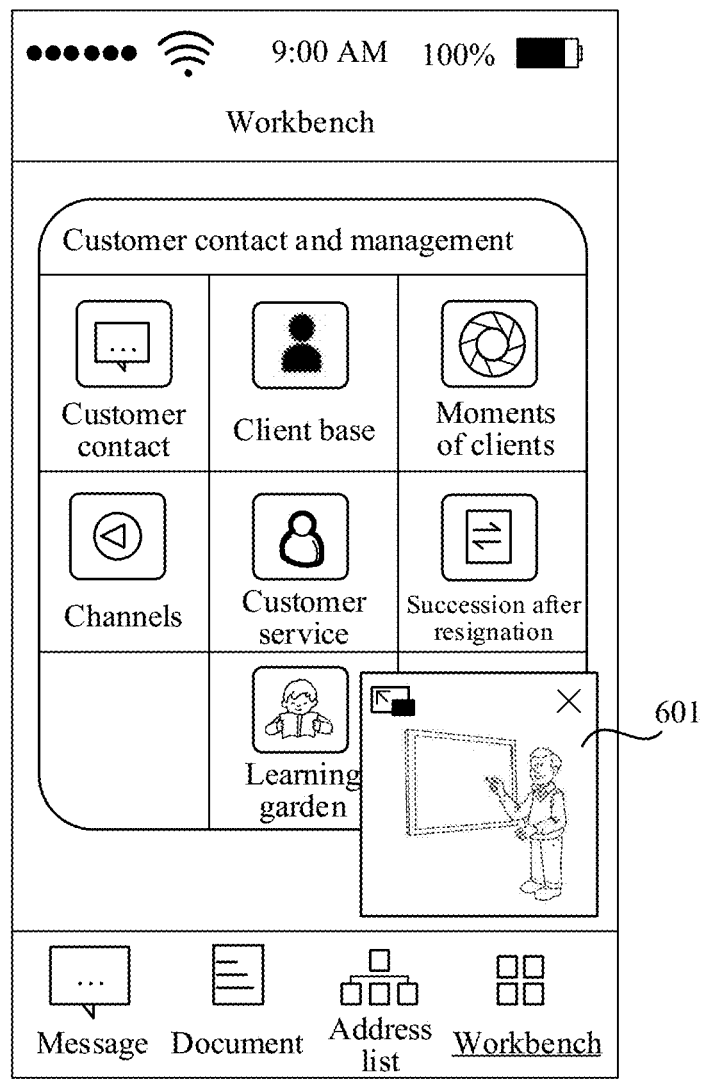
FIG. 6 is a diagram II of a workbench page provided by an embodiment of this disclosure.

In response to the page switching operation triggered in the learning page, the learning page is switched to the workbench page. The workbench page is shown in FIG. 6. The course video 1 is played using the video minimized playback mode in the lower right corner of the workbench page, namely, playing the course video 1 in the minimized window 601; the minimized window 601 also includes a page recovery button on the upper left and a close button on the upper right corner.

In response to a page recovery operation triggered in a workbench page, the workbench page is switched to the video playback page; the page recovery operation may be clicking a page recovery button in the minimized window 601. The video playback page is shown in FIG. 4. The video playback page includes a video playback area 401; the course video 1 is played in the video playback area 401, and relevant information about the course video 1 is displayed in other areas.

Figure 7:
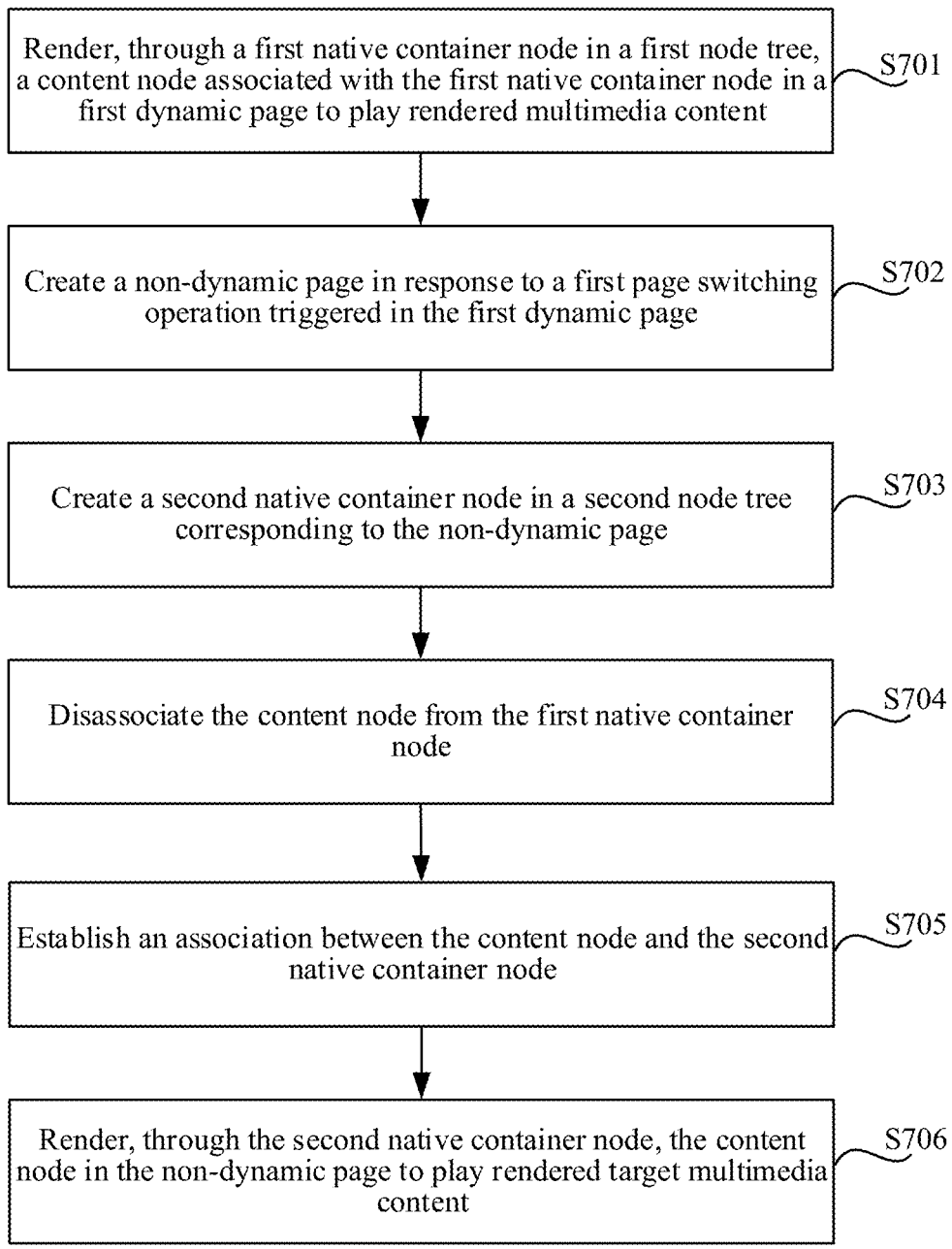
FIG. 7 is a flowchart diagram of a multimedia content processing method provided by an embodiment of this disclosure.

Based on the system architecture diagram shown in FIG. 1, the embodiment of this disclosure provides a flow of a multimedia content processing method as shown in FIG. 7; the flow of the method is executed by a computer device, the computer device may be a terminal device 101 and/or a server 102 shown in FIG. 1, including the following steps:

S701: Render, through a first native container node in a first node tree, a content node associated with the first native container node in a first dynamic page to play rendered multimedia content. For example, a content node associated with a first native container node is rendered through the first native container node in a first node tree of a dynamic page to play rendered multimedia content. The first native container node is supported by a native application framework provided by an operating system.

Specifically, a first node tree corresponding to the first dynamic page includes a content node corresponding to the multimedia content and a first native container node associated with the content node. The content node is used for generating the multimedia content to be played. The content node may be a native node. The native node is, for example, a base rendering node supported by a native application framework provided by an operating system. The multimedia content may be video, audio, and the like; and accordingly, the content nodes may be video nodes, audio nodes, and the like.

In an embodiment of this disclosure, an application contains a cross-platform dynamic framework, and the cross-platform dynamic framework is used for realizing relevant functions of a dynamic page. In order to embed native nodes such as native container nodes and content nodes in dynamic pages, the cross-platform dynamic framework supports embeddable native control technology.

In practical application scenarios, the embeddable native control technology supported by the cross-platform dynamic framework can be the same-layer rendering technology in applets or the platform view technology in JS+Flutter framework. The JS+Flutter framework and the platform view technology in the JS+Flutter framework are described in detail below.

Figure 8:
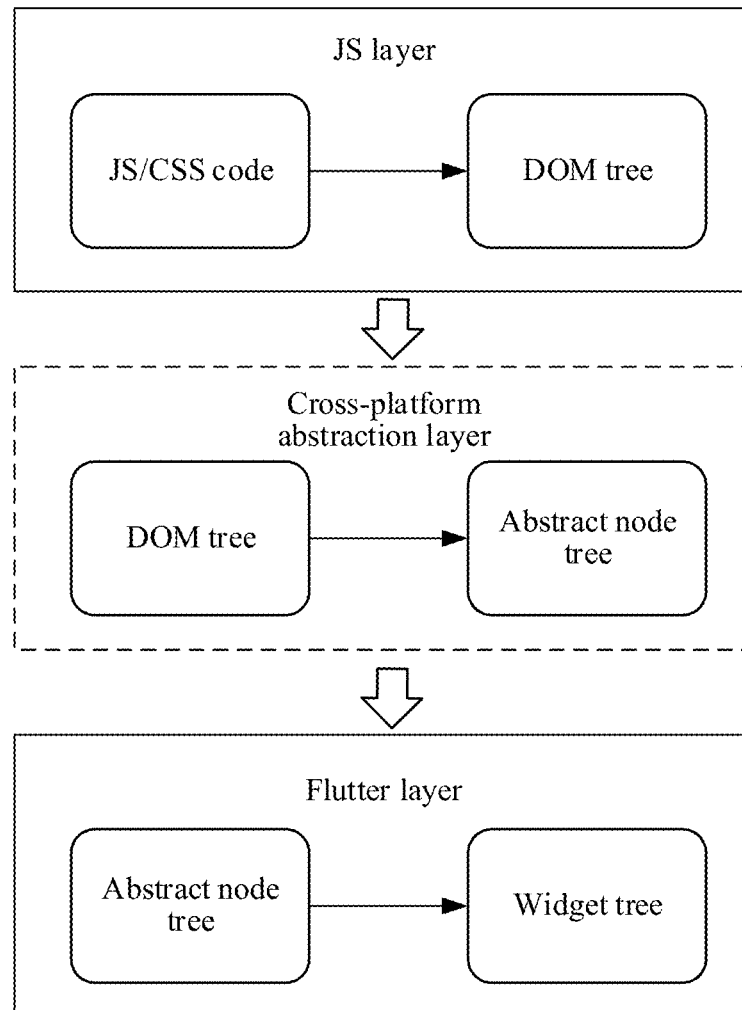
FIG. 8 is a structural diagram of a cross-platform dynamic framework provided by an embodiment of this disclosure.

Specifically, the JS+Flutter framework is a cross-platform dynamic framework, the structural diagram of which is shown in FIG. 8, including a JS layer, a cross-platform abstraction layer, and a Flutter layer.

The dynamic developer's JS/CSS code is parsed by the JS layer engine, and a node tree (DOM tree) inside the JS layer is generated. Then the DOM tree is transformed into the abstract node tree through the cross-platform abstraction layer, and the abstract node tree is mapped into the widget tree in the Flutter layer, and the rendering is completed through the Flutter rendering framework.

The platform view technology in the JS+Flutter framework refers to a single native node is rendered using the native rendering capability of a system (for example, an operating system of a device), and the rendered original data is obtained from a graphics processing unit (referred to as GPU for short), and the obtained original data is added to the rendering flow of the Flutter itself using a GPU graph pasting method, to achieve the effect of combining the native node with the rendering of the Flutter self-node, thereby achieving the support of an embeddable native control.

Under the above JS+Flutter framework, the first node tree in the embodiment of this disclosure is a Flutter widget tree, and the content node is a native node. The content node and the first native container node are embedded into the first node tree through the platform view technology, so that when the first node tree is rendered, the first native container node can be correspondingly rendered to further render the content node, and the rendered multimedia content is displayed in the first dynamic page.

S702: Create a non-dynamic page in response to a first page switching operation triggered in the first dynamic page. For example, a non-dynamic page is generated in response to a first page switching operation triggered in the first dynamic page.

Specifically, the first page switching operation may be a click operation, a double click operation, a slide operation, and the like. When a non-dynamic page is created, a second node tree corresponding to the non-dynamic page is correspondingly created; and since the non-dynamic page is a native page, the second node tree is, for example, a DOM tree.

S703: Create a second native container node in a second node tree corresponding to the non-dynamic page. For example, a second native container node is created in a second node tree of the non-dynamic page. The second native container node being supported by the native application framework provided by the operating system.

S704: Disassociate the content node from the first native container node. For example, the content node is disassociated from the first native container node.

S705: Establish an association between the content node and the second native container node. For example, an association between the content node and the second native container node is established.

In an embodiment, S703 to S705 may be performed by the container switching component. The container switching component may pre-register a page push notification in the cross-platform dynamic framework. When the first dynamic page switches to a non-dynamic page, the container switching component receives the page push notification sent by the cross-platform dynamic framework. Since the non-dynamic page is a native page, the corresponding second node tree itself supports a native node, so a second native container node can be directly created in the second node tree corresponding to the non-dynamic page via the container switching component. And then a content node is queried from a first node tree, the content node is disassociated from a first native container node, and an association between the content node and a second native container node is established, that is, switching a parent node of the content node from the first native container node to the second native container node.

Figure 9:
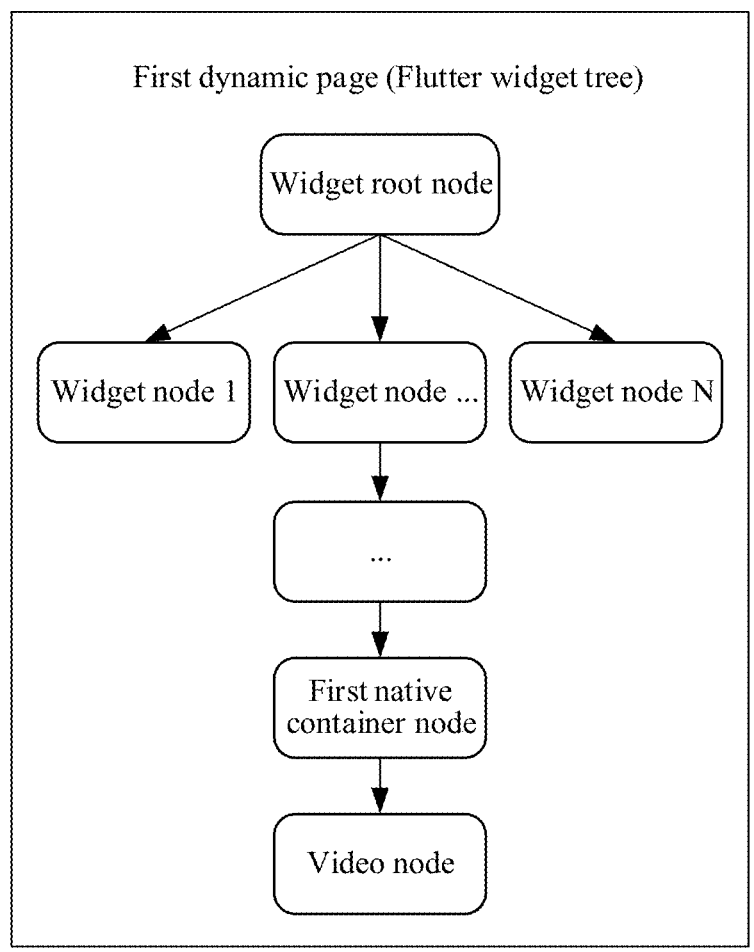
FIG. 9 is a structural diagram of a first node tree provided by an embodiment of this disclosure.

For example, as shown in FIG. 9, a first node tree corresponding to a first dynamic page is a Flutter widget tree; and before page switching, the first node tree includes a widget root node, N widget nodes, and a first native container node and a video node embedded via a platform view technology, the first native container node being a parent node of the video node.

Figure 10:
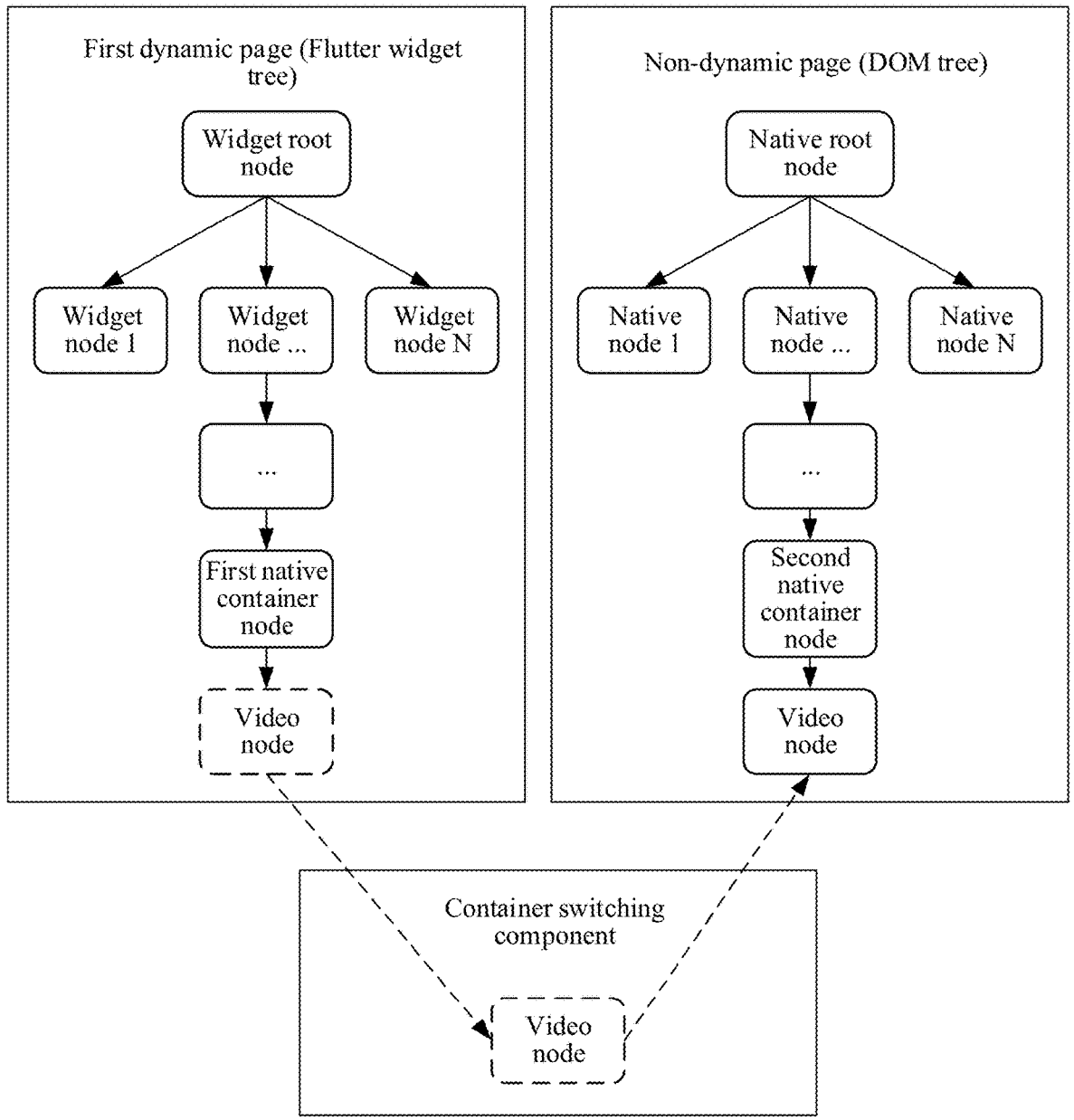
FIG. 10 is a diagram of a node tree switching process provided by an embodiment of this disclosure.

Referring to FIG. 10, a non-dynamic page is created in response to a first page switching operation triggered in a first dynamic page. A second native container node is created in a second node tree corresponding to the non-dynamic page through a container switching component; the content node is disassociated from the first native container node; and an association between the content node and the second native container node is established. The first node tree does not include a video node; and the second node tree is a DOM tree, including a native root node, N native nodes, a second native container node, and a video node, and the second native container node is a parent node of the video node.

S706: Render, through the second native container node, the content node in the non-dynamic page to play rendered target multimedia content. For example, the content node in a non-dynamic page is rendered through the second native container node to continue playing the rendered multimedia content in a portion of the generated non-dynamic page.

In an embodiment, a second node tree is rendered according to a node tree rendering rule; when a second native container node in the second node tree is rendered, the rendering of a content node associated with the second native container node is automatically triggered and the rendered multimedia content is presented in a non-dynamic page.

In an embodiment of this disclosure, when switching from a first dynamic page to a non-dynamic page is triggered, a second native container node is created in a second node tree corresponding to the non-dynamic page; the content node is disassociated from the first native container node; and an association between the content node and the second native container node is established. In this way, when rendering a non-dynamic page based on a second node tree, the embodiment of this disclosure can render a content node in the non-dynamic page via a second native container node, to realize continuing to play multimedia content on the non-dynamic page after page switching, thereby preventing the interruption of video playing in the page switching, improving the convenience of content presentation in a device and the performance of data processing on multimedia, and further improving the viewing experience of a user object.

In an embodiment, in the above S701, the second native container node carries display attribute information about the multimedia content in the non-dynamic page. The content node is rendered through the second native container node in the non-dynamic page according to the display attribute information, and the multimedia content is played on the non-dynamic page according to the display attribute information.

Specifically, the display attribute information about the multimedia content in the non-dynamic page can be preset, and the display attribute information includes a display position, a playback mode, a display size, and the like.

In a possible implementation, the multimedia content is video, and the display attribute information includes a video minimized playback mode and a first display position. The video minimized playback mode refers to a mode in which video is played with a small floating window.

During rendering, the content node is rendered in the non-dynamic page in accordance with the video minimized playback mode and the first display position via the second native container node; and the video is played in accordance with the video minimized playback mode in the first display position on the non-dynamic page.

Figure 11A:
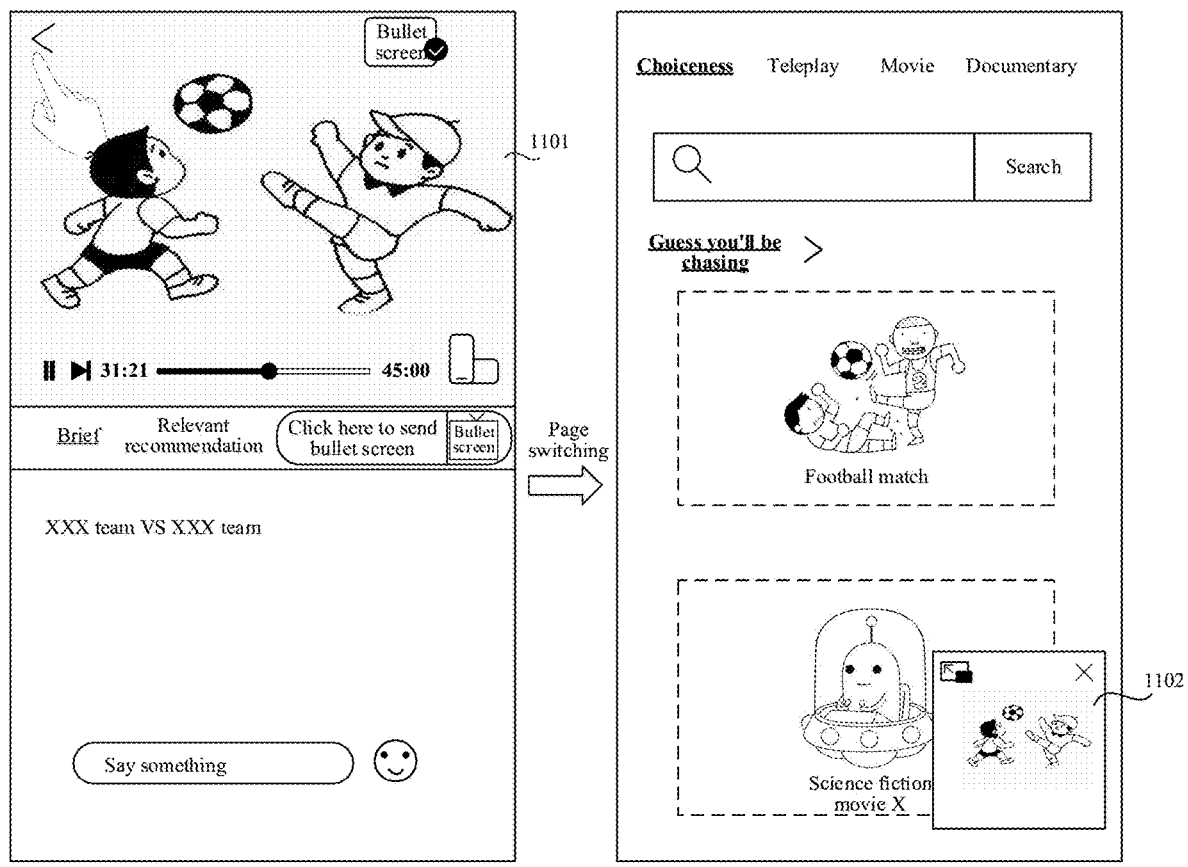
FIG. 11a is a diagram of a page switching process provided by an embodiment of this disclosure.

Illustrated with the multimedia content as a video, referring to FIG. 11a, it is a diagram of a page switching process in a video application provided by an embodiment of this disclosure. A first dynamic page includes a video playback area 1101, the video is played in the video playback area 1101, and relevant information about the video is displayed in other areas; the first dynamic page is in the form of a web page and is loaded and displayed via a browser embedded in the video application.

In response to a first page switching operation triggered in a first dynamic page, a non-dynamic page is displayed; and at a first display position 1102 of the non-dynamic page, the video is played in a video minimized playback mode; and the non-dynamic page is a native page and is directly loaded and displayed by a video application.

In an embodiment of this disclosure, in an application, when switching from a dynamic page to a non-dynamic page, a video played on the dynamic page can still be rendered in the non-dynamic page and is played on the non-dynamic page in a video minimized playback mode, so that the original content in the non-dynamic page is prevented from being blocked by the video, and at the same time, an object can continue to watch the video, thereby improving the use experience of the object.

In an embodiment, in the above S701, the embodiment of this disclosure obtains the multimedia content played in the first dynamic page using at least the following manner:

creating the first dynamic page in response to a playback operation triggered for the multimedia content in an application; creating, through a container switching component, the content node and the first native container node in the first node tree based on playback source information about the multimedia content; and rendering, through the first native container node, the content node in the first dynamic page to play the rendered multimedia content.

Specifically, a special multimedia tag is registered to the cross-platform dynamic framework in advance according to the embedding protocol of the dynamic framework, and the embedding protocol includes a specific tag type. A developer may specify the use of this specific multimedia tag in a corresponding dynamic page and specify relevant parameters for the multimedia tag, such as playback source information, display position, display size, playback mode, and page recovery information.

In a practical application process, after the first dynamic page is created, the first dynamic page is parsed through a cross-platform dynamic framework to obtain a multimedia tag corresponding to the multimedia content. The playback source information and page recovery information about the multimedia content are obtained from the multimedia tag, and the playback source information and the page recovery information are transmitted to the container switching component. At the same time, the display attribute information such as a display position, a display size, and a playback mode can also be transmitted to the container switching component.

In specific implementations, the page recovery information includes an identification and a path of the first dynamic page. For example, when the first dynamic page is an h5 page, the page recovery information about the first dynamic page is a uniform resource locator (URL) of the h5 page. For another example, when the first dynamic page is a dynamic page in an applet, the page recovery information about the first dynamic page is a program identification (ID) and a page path. For another example, when the first dynamic page is a dynamic page in an application (APP) program, the page recovery information about the first dynamic page is APP ID and a page path.

After obtaining playback source information about the multimedia content and page recovery information about the first dynamic page, the playback source information and the page recovery information are transparently transmitted to the container switching component via JS. The container switching component saves the playback source information and the page recovery information about the first dynamic page. By a container switching component, a content node and a first native container node are created in a first node tree based on playback source information about the multimedia content. The content node is mounted under the first native container node in the first node tree; the first native container node carries display attribute information, such as a display position, a display size, and a playback mode of the multimedia content in the first dynamic page.

During the rendering of the first node tree, according to the rendering rule of the node tree, when rendering the first native container node in the first node tree in the cross-platform dynamic framework, the node tree rendering flow of the native rendering system is automatically triggered, namely, rendering the content node under the first native container node according to the display attribute information about the content node, and then presenting the rendered multimedia content in the first dynamic page according to the display attribute information.

In an embodiment of this disclosure, a native container node is embedded in a first node tree of a first dynamic page, and the native content node is rendered in the first dynamic page by rendering the first native container node, thereby ensuring that multimedia content corresponding to the content node is normally played in the first dynamic page.

In a possible embodiment, after creating a content node and a first native container node in a first node tree based on playback source information about multimedia content by a container switching component, index information about the content node is obtained based on the position of the content node in the first node tree, and the index information about the content node is saved in the container switching component, namely, the container switching component retains a weak reference of the content node. Thus, when switching from a first dynamic page to a non-dynamic page, a content node can be queried from the first node tree by the container switching component and based on the index information. The content node is then disassociated from the first native container node, and the association between the content node and the second native container node is established. At this time, the index information about the content node saved in the container switching component can be updated to the position of the content node in the second node tree.

Further, the second native container node carries display attribute information about the multimedia content in the non-dynamic page; the display attribute information about the multimedia content in the non-dynamic page and the display attribute information about the multimedia content in the first dynamic page may be the same or different. The second node tree is then rendered according to the node tree rendering rules. When the second native container node is rendered, the rendering of the content node according to the display attribute information is automatically triggered, and the rendered multimedia content is displayed on the non-dynamic page according to the display attribute information.

In an embodiment of this disclosure, based on the position of a content node in a first node tree, index information about the content node is obtained; and the index information about the content node is stored in a container switching component; therefore, when performing page switching, based on the index information about the content node, the container switching component can quickly locate the position of the content node in the first node tree, strip the content node from a first native container node, and establish an association between the content node and a second native container node, thereby improving the efficiency of page rendering in the process of page switching, and further improving the viewing experience of a viewing object.

In an embodiment, after rendering a content node in a non-dynamic page by a second native container node and playing the rendered multimedia content, in response to a page recovery operation triggered in the non-dynamic page, a first dynamic page is created based on page recovery information saved in a container switching component. A first native container node is then created in the first node tree by the container switching component, the content node is disassociated from the second native container node, and the association between the content node and the first native container node is established. The content node is then rendered in the first dynamic page via the first native container node and the rendered multimedia content is played.

Specifically, after switching from the first dynamic page to the non-dynamic page, the first dynamic page is destroyed accordingly. Thus, upon page recovery, the first dynamic page needs to be recreated. The first dynamic page is parsed through a cross-platform dynamic framework to obtain a multimedia tag corresponding to the multimedia content. The playback source information and page recovery information about the multimedia content are obtained from the multimedia tag, and the playback source information and the page recovery information are transmitted to the container switching component.

Since the index information about the content node, that is, the position of the content node in the second node tree, is stored in the container switching component, there is no need to create a new content node, but only to create a first native container node again. The content node is then queried from the second node tree by the container switching component based on the index information; the content node is disassociated from the second native container node; and an association between the content node and the first native container node is established. At this time, the index information about the content node saved in the container switching component is updated to the position of the content node in the first node tree again.

According to the rendering rules of the node tree, a first native container node and a content node in a first node tree are rendered in a cross-platform dynamic framework, and then the rendered multimedia content is presented in a first dynamic page according to the display attribute information.

Figure 11B:
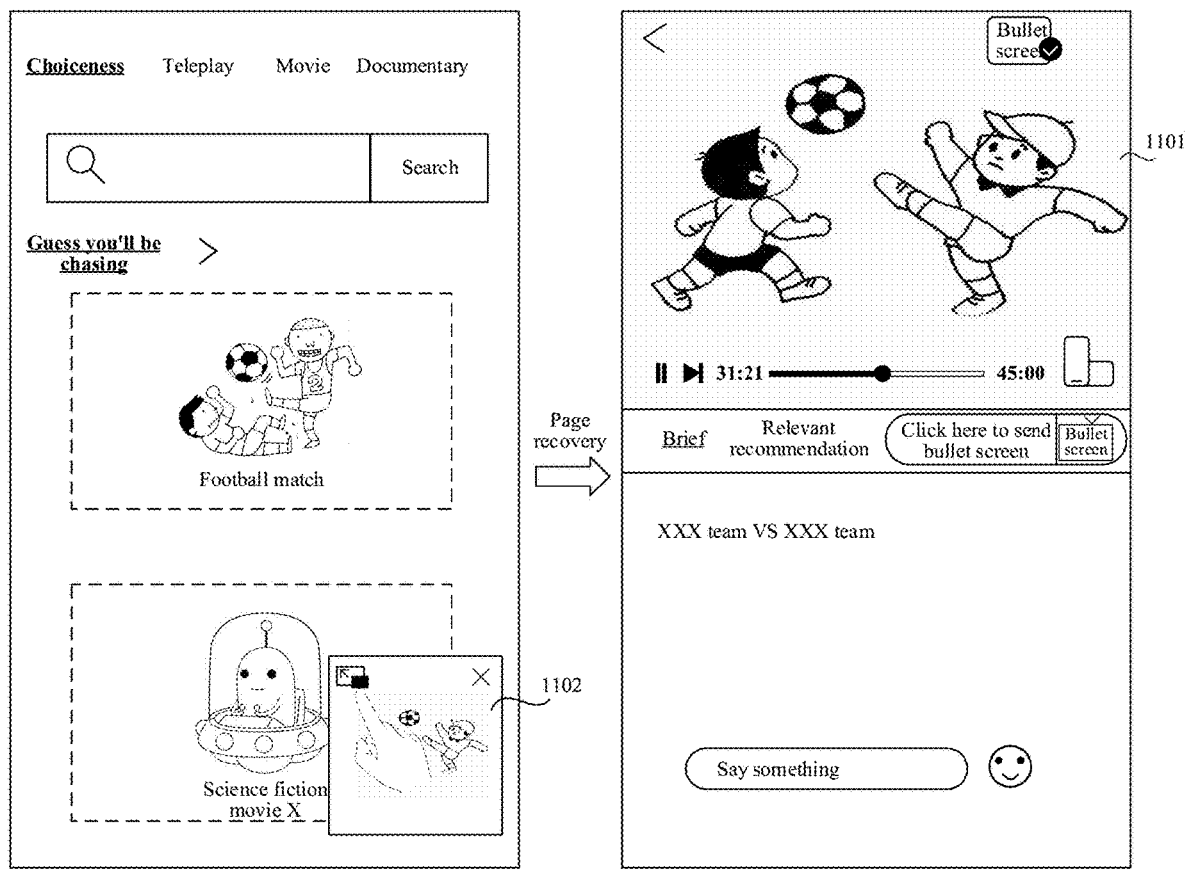
FIG. 11b is a schematic diagram of a page recovery process provided by an embodiment of this disclosure.

For example, illustrated with the multimedia content as a video, referring to FIG. 11b, it is a diagram of a page recovery process provided by an embodiment of this disclosure. At a first display position 1102 of a non-dynamic page, the video is played in a video minimized playback mode, and other areas of the non-dynamic page display the original content of the non-dynamic page.

In response to an operation of clicking a page recovery button in a non-dynamic page, a first dynamic page is displayed. A second dynamic page includes a video playback area 1101; a video is played in the video playback area 1101, and relevant information about the video is displayed in other areas.

In an embodiment of this disclosure, after switching from a dynamic page to a non-dynamic page, it is still possible to recover from the non-dynamic page to the dynamic page in response to a page recovery operation while maintaining the rendering of the multimedia content in the dynamic page, so that the multimedia content can continue to play on the dynamic page, ensuring the fluency of the video viewed by the object, thereby improving the viewing experience.

In an embodiment, in addition to supporting maintaining the rendering of multimedia content when switching from a dynamic page to a non-dynamic page, the application in the embodiment of this disclosure also supports maintaining the rendering of multimedia content when switching from one dynamic page to another dynamic page, and the details are as follows:

creating a second dynamic page in response to a second page switching operation triggered in the first dynamic page; and rendering, through the first native container node, the content node in the second dynamic page to play the rendered multimedia content.

Specifically, since the first dynamic page and the second dynamic page correspond to the same cross-platform dynamic framework, the first dynamic page and the second dynamic page share a first node tree. Based on this, when switching from the first dynamic page to the second dynamic page, a native container node need not be additionally created via the container switching component; and the first native container node and the content node in the first node tree can be leaned along while the display attribute information about the multimedia content carried in the first native container node is modified. The content node is then rendered according to the display attribute information about the modified multimedia content, and the rendered multimedia content is displayed according to the display attribute information about the modified multimedia content.

In a possible implementation, the multimedia content is a video; and the display attribute information about the modified multimedia content is a second display position and a video minimized playback mode.

The content node is rendered in the second dynamic page through the first native container node according to a video minimized playback mode and a second display position. The rendered video is played according to the video minimized playback mode at the second display position in the second dynamic page.

Specifically, during the rendering the first node tree, according to the rendering rule of the node tree, when rendering the first native container node in the first node tree in the cross-platform dynamic framework, the node tree rendering flow of the native rendering system is automatically triggered, namely, rendering the content node under the first native container node according to the display attribute information about the video, and then presenting the rendered video in the second dynamic page according to the display attribute information.

In an embodiment of this disclosure, in an application, when switching from one dynamic page to another dynamic page, a video played on one dynamic page can still be rendered on another dynamic page and is played on another dynamic page in a video minimized playback mode, so that the original content on another dynamic page is prevented from being blocked by the video, and at the same time, an object can continue to watch the video, thereby improving the use experience of the object.

It should be noted that after switching from the first dynamic page to the second dynamic page, it is also possible to continue switching from the second dynamic page to the non-dynamic page and then, in response to a page recovery operation in the non-dynamic page, either directly to the first dynamic page from the non-dynamic page or to the second dynamic page. That is, in this disclosure, a switching and recovery relationship between each page in an application can be set according to actual requirements, and for this, this disclosure does not make a specific definition.

Figure 12:
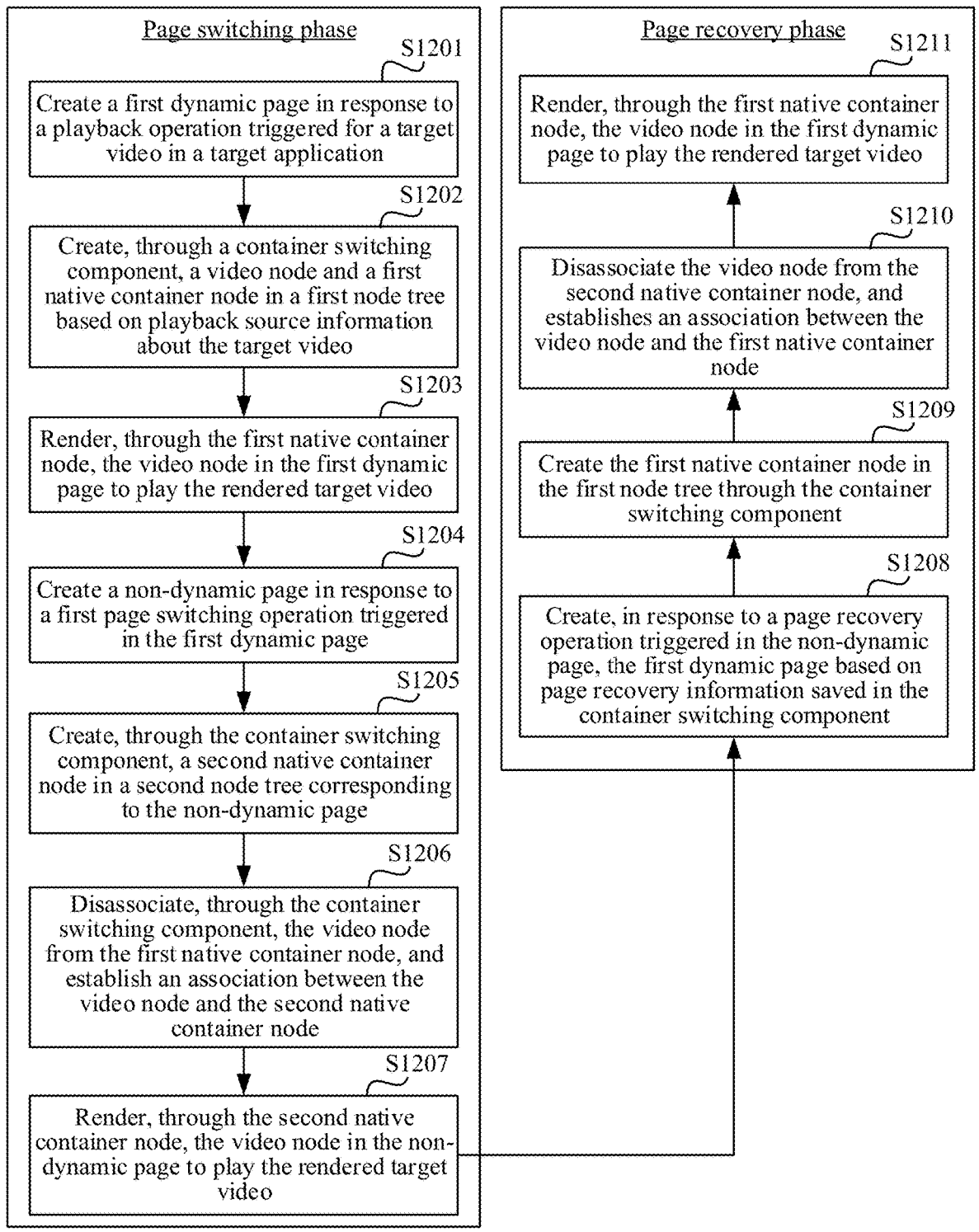
FIG. 12 is a flowchart diagram of a multimedia content processing method provided by an embodiment of this disclosure.

In order to better explain the embodiments of this disclosure, a multimedia content processing method provided by the embodiments of this disclosure is described below in conjunction with a specific implementation scenario; and the flow of the method may be executed by a terminal device 101 as shown in FIG. 1, and as shown in FIG. 12, including the following page switching phase and page recovery phase.

In the page switching phase, the following steps are included:

S1201: Create a first dynamic page in response to a playback operation triggered for a video in an application.

Through a cross-platform dynamic framework, the first dynamic page is parsed to obtain a video label corresponding to the video. The playback source information about the video and page recovery information about the first dynamic page are obtained from the video tag, and the playback source information and the page recovery information are transmitted to the container switching component.

S1202: Create, through a container switching component, a video node and a first native container node in a first node tree based on the playback source information about the video.

Based on the position of the video node in the first node tree, index information about the video node is obtained, and the index information about the video node is saved in the container switching component.

S1203: Render, through a first native container node, a video node in a first dynamic page to play the rendered video.

S1204: Create a non-dynamic page in response to a first page switching operation triggered in the first dynamic page.

S1205: Create, through the container switching component, a second native container node in a second node tree corresponding to the non-dynamic page.

S1206: Disassociate, through the container switching component, the video node from the first native container node, and establish an association between the video node and the second native container node.

In an embodiment, a video node is queried from the first node tree by the container switching component based on the index information. The video node is then disassociated from the first native container node, and association between the video node and the second native container node is established. The index information is updated to the position of the video node in the second node tree.

S1207: Render, through a second native container node, a video node in a non-dynamic page to play the rendered video.

In the page recovery phase, the following steps are included:

S1208: Create, in response to a page recovery operation triggered in the non-dynamic page, the first dynamic page based on page recovery information saved in the container switching component.

Through a cross-platform dynamic framework, the first dynamic page is parsed to obtain a video label corresponding to the video. The playback source information about the video and page recovery information about the first dynamic page are obtained from the video tag, and the playback source information and the page recovery information are transmitted to the container switching component.

S1209: Create a first native container node in a first node tree through a container switching component.

S1210: Disassociate the video node from the second native container node, and establishes an association between the video node and the first native container node.

Specifically, a video node is queried from the second node tree by the container switching component based on the index information. The video node is then disassociated from the second native container node, and the association between the video node and the first native container node is established. The index information is updated to the position of the video node in the first node tree.

S1211: Render, through a first native container node, a video node in a first dynamic page to play the rendered video.

In an embodiment of this disclosure, when switching from a first dynamic page to a non-dynamic page is triggered, a second native container node can be created in a second node tree corresponding to the non-dynamic page via a container switching component, and a view node is disassociated from the first native container node, and the association between the view node and the second native container node is established; therefore, when rendering the non-dynamic page based on the second node tree, the view node can be correspondingly rendered in the non-dynamic page via the second native container node, to continue rendering and playing the video on the non-dynamic page after the page switching. Thus, the interruption of video playback can be prevented in page switching, the convenience of content presentation in the device and the data processing performance of multimedia are improved, and the viewing experience of the user object is further improved.

Figure 13:
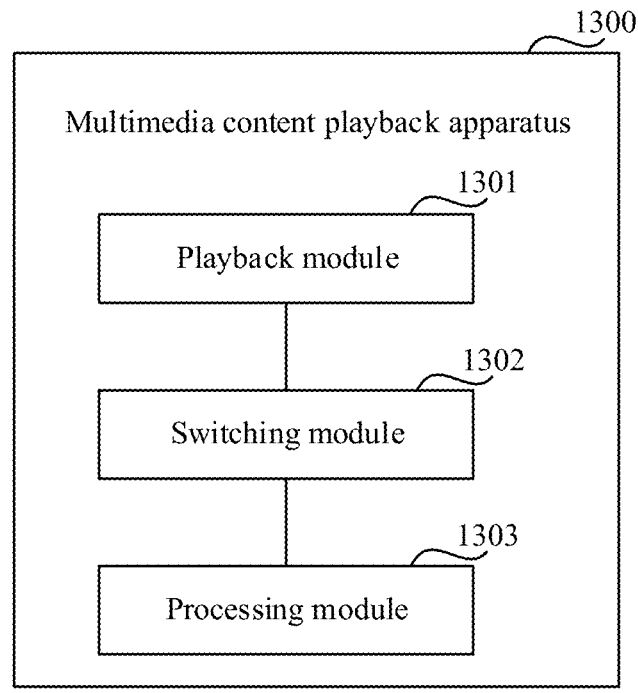
FIG. 13 is a structural diagram of a multimedia content processing apparatus provided by an embodiment of this disclosure.

Based on the same technical concept, the embodiments of this disclosure provide a structural diagram of a multimedia content processing apparatus, and as shown in FIG. 13, the multimedia content processing apparatus 1300 includes:

a playback module 1301, configured to render, through a first native container node in a first node tree, a content node associated with the first native container node in a first dynamic page to play rendered multimedia content;

a switching module 1302, configured to create a non-dynamic page in response to a first page switching operation triggered in the first dynamic page;

a processing module 1303, configured to create a second native container node in a second node tree corresponding to the non-dynamic page, disassociate the content node from the first native container node, and establish an association between the content node and the second native container node; and the playback module 1301, configured to render, through the second native container node, the content node in the non-dynamic page to play rendered target multimedia content.

In an embodiment, the playback module 1301 is specifically configured to:

render, through the second native container node, the content node in the non-dynamic page according to the display attribute information, and play the multimedia content on the non-dynamic page according to the display attribute information.

In an embodiment, the display attribute information includes a video minimized playback mode and a first display position, and the multimedia content is a video.

The playback module 1301 is specifically configured to:

play the video according to the video minimized playback mode at the first display position on the non-dynamic page.

In an embodiment, the playback module 1301 is specifically configured to:

create the first dynamic page in response to a playback operation triggered for the multimedia content in an application;

create, through a container switching component, the content node and the first native container node in the first node tree based on playback source information about the multimedia content; and
render, through the first native container node, the content node in the first dynamic page to play the rendered multimedia content.

In an embodiment, the switching module 1302 is further configured to:
create, in response to a page recovery operation triggered in the non-dynamic page, a first dynamic page based on page recovery information saved in a container switching component after rendering a content node in a non-dynamic page through a second native container node and playing the rendered multimedia content.

The processing module 1303 is further configured to:
create, through the container switching component, the first native container node in the first node tree, disassociate the content node from the second native container node, and establish an association between the content node and the first native container node.

The playback module 1301 is further configured to:
render, through the first native container node, the content node in the first dynamic page to play the rendered multimedia content.

In an embodiment, the processing module 1303 is further configured to:
parse the first dynamic page to obtain a multimedia tag corresponding to the multimedia content before creating, through a container switching component, the content node and the first native container node in the first node tree based on playback source information about the multimedia content; and
acquire the playback source information about the multimedia content and page recovery information about the first dynamic page from the multimedia tag, and transmit the playback source information and the page recovery information to the container switching component.

In an embodiment, the processing module 1303 is further configured to:
obtain, based on a position of the content node in the first node tree, index information about the content node, and save the index information about the content node in the container switching component after creating, through a container switching component, the content node and the first native container node in the first node tree based on playback source information about the multimedia content.

The processing module 1303 is further configured to:
query, through the container switching component, the content node from the first node tree based on the index information before disassociating the content node from the first native container node and establishing an association between the content node and the second native container node.

In an embodiment, the switching module 1302 is further configured to:
create a second dynamic page in response to a second page switching operation triggered in the first dynamic page.

The playback module 1301 is further configured to:
render, through the first native container node, the content node in the second dynamic page to play rendered multimedia content.

In an embodiment, the multimedia content is a video.
The playback module 1301 is specifically configured to:
render, through the first native container node, the content node in the second dynamic page according to a video minimized playback mode and a second display position; and
play the rendered video according to the video minimized playback mode at the second display position on the second dynamic page.

In an embodiment of this disclosure, when switching from a first dynamic page to a non-dynamic page is triggered, a second native container node can be created in a second node tree corresponding to the non-dynamic page via a container switching component, and a view node is disassociated from the first native container node, and the association between the view node and the second native container node is established; therefore, when rendering the non-dynamic page based on the second node tree, the view node can be correspondingly rendered in the non-dynamic page via the second native container node, to continue rendering and playing the video on the non-dynamic page after the page switching. Thus, the interruption of video playback can be prevented in page switching, the convenience of content presentation in the device and the data processing performance of multimedia are improved, and the viewing experience of the user object is further improved.

Figure 14:
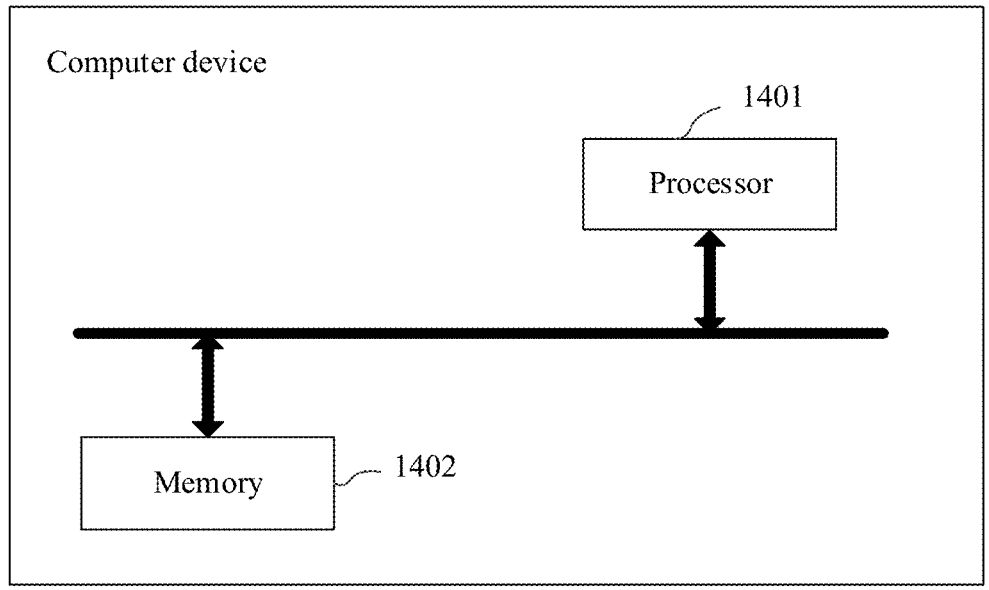
FIG. 14 is a structural diagram of a computer device provided by an embodiment of this disclosure.

Based on the same technical concept, the embodiments of this disclosure provide a computer device; the computer device may be a terminal device and/or a server as shown in FIG. 1, as shown in FIG. 14, including at least one processor 1401 (processing circuitry) and a memory 1402 (non-transitory computer-readable storage medium) connected to the at least one processor. The embodiments of this disclosure do not define the specific connection medium between the processor 1401 and the memory 1402. In FIG. 14, the connection between the processor 1401 and the memory 1402 is exemplified by a bus. The bus can be divided into an address bus, a data bus, a control bus, and the like.

In an embodiment of this disclosure, the memory 1402 stores instructions executable by the at least one processor 1401, and the at least one processor 1401 may perform the steps of the multimedia content processing method described above by executing the instructions stored in the memory 1402.

The processor 1401 is a control center of a computer device, and various interfaces and lines can be used to connect various parts of the computer device to realize multimedia content playback by running or executing instructions stored in the memory 1402 and calling data stored in the memory 1402. Alternatively, the processor 1401 may include one or more processing units, and the processor 1401 may integrate an application processor, which primarily handles operating systems, user interfaces, applications, and the like, and a modem processor, which primarily handles wireless communications. It will be appreciated that the modem processor described above may not be integrated into the processor 1401. In some embodiments, the processor 1401 and memory 1402 may be implemented on the same chip, or they may be implemented separately on separate chips in some embodiments.

The processor 1401 may be a general-purpose processor, such as a central processing unit (CPU), a digital signal processor, an application specific integrated circuit (ASIC), a field programmable gate array (FPGA) or other programmable logic device, a discrete gate, a transistor logic device, a discrete hardware component, and may implement or perform the methods, steps, and logic blocks disclosed in the embodiments. The general-purpose processor may be a microprocessor, or any conventional processor, and the like. The steps of the method disclosed in connection with the embodiments of this disclosure may be embodied directly in a hardware processor, or in a combination of hardware and software modules within a processor.

The memory 1402 is a non-volatile (non-transitory) computer-readable storage medium that may be used for storing non-volatile software programs, non-volatile computer-executable programs, and modules. The memory 1402 may include at least one type of storage medium, and may include, for example, a flash memory, a hard disk, a multimedia card, a card-type memory, a random-access memory (RAM), a static random-access memory (SRAM), a programmable read-only memory (PROM), a read-only memory (ROM), an electrically erasable programmable read-only memory (EEPROM), a magnetic memory, a magnetic disk, and an optical disk. The memory 1402 is any other medium that can be used for carrying or storing desired program codes in the form of instructions or data structures and that can be accessed by a computer device, but is not limited to such. The memory 1402 in embodiments of this disclosure may also be circuitry or any other apparatus capable of implementing storage functions for storing program instructions and/or data.

The embodiments of this disclosure provide a computer-readable storage medium storing computer programs executable by a computer device, the programs, when being run on the computer device, causing the computer device to execute steps of the multimedia content processing method.

The embodiments of this disclosure provide a computer program product including computer programs stored on a computer-readable storage medium, the computer programs including program instructions, and the program instructions, when executed by a computer device, causing the computer device to execute steps of the multimedia content processing method.

It will be appreciated by the skilled in the art that embodiments of this disclosure may be provided as a method or a computer program product. Accordingly, this disclosure may take the form of an entirely hardware embodiment, an entirely software embodiment, or an embodiment combining software and hardware aspects. Furthermore, this disclosure may take the form of a computer program product embodied on one or more computer-usable storage media (including, but not limited to, a disk storage, a compact disc read-only memory (CD-ROM), and optical storage) containing computer-usable program code therein.

This disclosure is described with reference to flowcharts and/or block diagrams of methods, devices (systems), and computer program products according to the embodiments of this disclosure. It will be understood that each flow and/or block of the flowcharts and/or block diagrams, and combinations of flows and/or blocks in the flowcharts and/or block diagrams, can be implemented by computer program instructions. These computer program instructions may be provided to a general-purpose computer, a special-purpose computer, an embedded processor, or a processor of another programmable data processing device to generate a machine, so that an apparatus configured to implement functions specified in one or more flows in the flowcharts and/or one or more blocks in the block diagrams is generated using instructions executed by the computer or the processor of other programmable data processing device.

These computer program instructions may be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more flows in the flowcharts and/or in one or more blocks in the block diagrams.

These computer program instructions may further be loaded onto a computer or other programmable data processing device, so that a series of operations and steps are performed on the computer or other programmable device, thereby generating computer-implemented processing. Therefore, the instructions executed on the computer or other programmable device provide steps for implementing a specific function in one or more flows in the flowcharts and/or in one or more blocks in the block diagrams.

Although exemplary embodiments of this disclosure have been described, once persons skilled in the art know the basic creative concept, they can make additional changes and modifications to these embodiments. Therefore, it is intended that the appended claims be interpreted as including all such alterations and modifications as fall within the true scope of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A multimedia content processing method comprising:
rendering, through a first native container node in a first node tree of a dynamic page, a content node associated with the first native container node to play rendered multimedia content, the first native container node being supported by a native application framework provided by an operating system;
generating a non-dynamic page in response to a first page switching operation triggered in the dynamic page;
creating a second native container node in a second node tree of the non-dynamic page, the second native container node being supported by the native application framework provided by the operating system;
disassociating the content node from the first native container node;
establishing an association between the content node and the second native container node; and
rendering, through the second native container node, the content node in the non-dynamic page to continue playing the rendered multimedia content in a portion of the generated non-dynamic page.

2. The method according to claim 1, wherein
the second native container node includes display attribute information of the multimedia content in the non-dynamic page; and
the rendering, through the second native container node, the content node in the non-dynamic page comprises:
rendering, through the second native container node, the content node in the non-dynamic page according to the display attribute information, and continuing to play the multimedia content in the portion of the non-dynamic page according to the display attribute information.

3. The method according to claim 2, wherein
the display attribute information comprises a video minimized playback mode and a first display position, and the multimedia content is a video; and
the playing the multimedia content in the portion of the non-dynamic page according to the display attribute information comprises:
playing the video according to the video minimized playback mode at the first display position on the non-dynamic page.

4. The method according to claim 1, wherein the rendering, through the first native container node in the first node tree of the dynamic page, the content node comprises:
generating the dynamic page in response to a playback operation triggered for the multimedia content in an application;
creating, through a container switching component, the content node and the first native container node in the first node tree based on playback source information of the multimedia content; and
rendering, through the first native container node, the content node in the dynamic page to play the rendered multimedia content.

5. The method according to claim 4, further comprising:
generating, in response to a page recovery operation triggered in the non-dynamic page, the dynamic page based on page recovery information saved in the container switching component;
creating, through the container switching component, the first native container node in the first node tree, disassociating the content node from the second native container node, and establishing an association between the content node and the first native container node; and
rendering, through the first native container node, the content node in the dynamic page to continue playing the rendered multimedia content.

6. The method according to claim 5, further comprising:
parsing the dynamic page to obtain a multimedia tag corresponding to the multimedia content; and
acquiring the playback source information of the multimedia content and page recovery information of the dynamic page from the multimedia tag, and transmitting the playback source information and the page recovery information to the container switching component.

7. The method according to claim 4, further comprising:
obtaining, based on a position of the content node in the first node tree, index information of the content node, and saving the index information of the content node in the container switching component; and
before the disassociating the content node from the first native container node, and the establishing the association between the content node and the second native container node, querying, through the container switching component, the content node from the first node tree based on the saved index information.

8. The method according to claim 4, further comprising:
generating a second dynamic page in response to a second page switching operation triggered in the dynamic page; and
rendering, through the first native container node, the content node in the second dynamic page to continue playing the rendered multimedia content.

9. The method according to claim 8, wherein
the multimedia content is a video; and
the rendering, through the first native container node, the content node in the second dynamic page comprises:
rendering, through the first native container node, the content node in the second dynamic page according to a video minimized playback mode and a second display position; and
continuing to play the rendered video according to the video minimized playback mode at the second display position on the second dynamic page.

10. A multimedia content processing apparatus, comprising:
processing circuitry configured to
render, through a first native container node in a first node tree of a dynamic page, a content node associated with the first native container node to play rendered multimedia content, the first native container node being supported by a native application framework provided by an operating system;
generate a non-dynamic page in response to a first page switching operation triggered in the dynamic page;
create a second native container node in a second node tree of the non-dynamic page, the second native container node being supported by the native application framework provided by the operating system;
disassociate the content node from the first native container node, and establish an association between the content node and the second native container node; and
render, through the second native container node, the content node in the non-dynamic page to continue playing the rendered multimedia content in a portion of the generated non-dynamic page.

11. The apparatus according to claim 10, wherein
the second native container node includes display attribute information of the multimedia content in the non-dynamic page; and
the processing circuitry is further configured to:
render, through the second native container node, the content node in the non-dynamic page according to the display attribute information, and continue to play the multimedia content in the portion of the non-dynamic page according to the display attribute information.

12. The apparatus according to claim 11, wherein
the display attribute information comprises a video minimized playback mode and a first display position, and the multimedia content is a video; and
the processing circuitry is further configured to:
continue to play the video according to the video minimized playback mode at the first display position on the non-dynamic page.

13. The apparatus according to claim 10, wherein the processing circuitry is further configured to:
generate the dynamic page in response to a playback operation triggered for the multimedia content in an application;

create, through a container switching component, the content node and the first native container node in the first node tree based on playback source information of the multimedia content; and
render, through the first native container node, the content node in the dynamic page to play the rendered multimedia content.

14. The apparatus according to claim 13, wherein the processing circuitry is further configured to:
generate, in response to a page recovery operation triggered in the non-dynamic page, the dynamic page based on page recovery information saved in the container switching component;
create, through the container switching component, the first native container node in the first node tree, disassociate the content node from the second native container node, and establish an association between the content node and the first native container node; and
render, through the first native container node, the content node in the dynamic page to continue playing the rendered multimedia content.

15. The apparatus according to claim 14, wherein the processing circuitry is further configured to:
parse the dynamic page to obtain a multimedia tag corresponding to the multimedia content; and
acquire the playback source information of the multimedia content and page recovery information of the dynamic page from the multimedia tag, and transmit the playback source information and the page recovery information to the container switching component.

16. The apparatus according to claim 13, wherein the processing circuitry is further configured to:
obtain, based on a position of the content node in the first node tree, index information of the content node, and save the index information of the content node in the container switching component; and
before disassociating the content node from the first native container node, and establishing the association between the content node and the second native container node, query, through the container switching component, the content node from the first node tree based on the saved index information.

17. The apparatus according to claim 13, wherein the processing circuitry is further configured to:
generate a second dynamic page in response to a second page switching operation triggered in the dynamic page; and
render, through the first native container node, the content node in the second dynamic page to continue playing the rendered multimedia content.

18. The apparatus according to claim 17, wherein the multimedia content is a video; and
the processing circuitry is further configured to:
render, through the first native container node, the content node in the second dynamic page according to a video minimized playback mode and a second display position; and
continue to play the rendered video according to the video minimized playback mode at the second display position on the second dynamic page.

19. A non-transitory computer-readable storage medium storing computer-readable instructions thereon, which, when executed by processing circuitry, cause the processing circuitry to perform a multimedia content processing method comprising:
rendering, through a first native container node in a first node tree of a dynamic page, a content node associated with the first native container node to play rendered multimedia content, the first native container node being supported by a native application framework provided by an operating system;
generating a non-dynamic page in response to a first page switching operation triggered in the dynamic page;
creating a second native container node in a second node tree of the non-dynamic page, the second native container node being supported by the native application framework provided by the operating system;
disassociating the content node from the first native container node;
establishing an association between the content node and the second native container node; and
rendering, through the second native container node, the content node in the non-dynamic page to continue playing the rendered multimedia content in a portion of the generated non-dynamic page.

20. The non-transitory computer-readable storage medium according to claim 19, wherein
the second native container node includes display attribute information of the multimedia content in the non-dynamic page; and
the rendering, through the second native container node, the content node in the non-dynamic page comprises:
rendering, through the second native container node, the content node in the non-dynamic page according to the display attribute information, and playing the multimedia content in the portion of the non-dynamic page according to the display attribute information.

* * * * *